United States Patent [19]
Harnden, Jr. et al.
[11] 3,714,508
[45] Jan. 30, 1973

[54] SEQUENTIAL FLASHING OF MULTIPLE FLASH LAMPS BY LOW COST STATIC CONTROL CIRCUIT OF INTEGRATED DESIGN

[75] Inventors: John D. Harnden, Jr.; William P. Kornrumpf, both of Schenectady; Robert A. Marquardt, Baldeinsville, all of N.Y.

[73] Assignee: General Electric Company

[22] Filed: Feb. 22, 1971

[21] Appl. No.: 117,774

Related U.S. Application Data

[63] Continuation of Ser. No. 784,067, Dec. 16, 1968, abandoned.

[52] U.S. Cl. ..................315/241, 315/209, 315/232, 315/323, 307/293, 307/305, 431/95
[51] Int. Cl. ........................H05b 57/00, H05b 39/00
[58] Field of Search .......315/209, 209 CD, 251, 246, 315/232, 323, 252, 84.5, 241, 197, 163; 307/223, 224, 221, 252, 293, 305, ; 431/95

[56] References Cited

UNITED STATES PATENTS

| | | | |
|---|---|---|---|
| 3,019,393 | 1/1962 | Rockafellow | 315/323 X |
| 3,484,626 | 12/1969 | Grafham | 307/305 X |
| 3,501,254 | 3/1970 | Nijland et al. | 431/95 |
| 3,518,487 | 6/1970 | Tanaka et al. | 315/232 |

*Primary Examiner*—John W. Huckert
*Assistant Examiner*—Andrew J. James
*Attorney*—Norman C. Fulmer, Henry P. Truesdell, Frank L. Neuhauser, Oscar B. Waddell and Joseph B. Forman

[57] ABSTRACT

Electronic circuitry for sequentially firing photoflash lamps of an array of multiple flash lamps. The circuitry comprises means for causing capacitors to be charged, at different rates of charging, upon the occurrence of a start-flash signal. These capacitors are respectively associated, by means of solid state switching devices, with certain flashlamps of the array, and the unfired flashlamp associated with the charging capacitor which first reaches a predetermined voltage, will be the first to fire. Alternatively, the first lamp to be fired need not be associated with a capacitor. Upon a lamp firing, disenabling circuitry causes discontinuing of charging of the capacitors until occurrence of the next start-flash signal, whereupon the capacitors repeat or resume their charging until the unfired flashlamp becomes fired which is associated with the next charging capacitor to reach the predetermined firing voltage. The procedure is repeated for causing sequential firing of all flashlamps in the array. Circuit modifications and alternative embodiments disclosed, including a single-capacitor circuit.

12 Claims, 6 Drawing Figures

Inventors:
John D. Harnden, Jr.
William P. Kornrumpf,
Robert A. Marquardt,
by Donald R Campbell
Their Attorney.

Inventors:
John D. Harnden, Jr.
William P. Kornrumpf,
Robert A. Marquardt,
by [signature]
Their Attorney.

Inventors:
John D. Harnden, Jr.
William P. Kornrumpf,
Robert A. Marquardt,
by Donald R. Campbell
Their Attorney.

SEQUENTIAL FLASHING OF MULTIPLE FLASH LAMPS BY LOW COST STATIC CONTROL CIRCUIT OF INTEGRATED DESIGN

This application is a continuation of Ser. No. 784,067 filed Dec. 16, 1968, and which is now abandoned.

This invention relates to new and improved static electronic control circuits for use in conjunction with electronically operated, multiple photoflash lamp assemblies.

More particularly, the invention relates to a family of new and improved, static electronic control circuits for use with electronically operated, multiple photoflash lamp assemblies, and which include a plurality of individually operable, static electronic switching devices for controlling current flow through the respective flashbulbs, and circuit enabling logic circuitry for controlling turn-on of the respective switching devices. The circuit enabling logic circuitry is comprised by capacitor charging circuitry used in conjunction with variable charge rate circuit elements for developing differently timed threshold value, turn-on electric signals that are supplied to respective ones of the individual, static electronic switching devices.

It is a primary object of the invention to provide a family of new and improved, static electronic control circuits for use in conjunction with electronically operable multiple photoflash lamp assemblies.

Another object of the invention is to provide a family of new, static electronic control circuits for multiple photoflash lamp assemblies which include a plurality of individually operable, static electronic switching devices (preferably solid state, semiconductor, gate-controlled thyristor devices) for individually controlling current flow through respective flashbulbs in the multiple array, and circuit enabling logic circuitry for controlling turn-on of the respective switching devices. The circuit enabling logic circuitry is comprised by capacitor charging circuitry used in conjunction with variable charge rate control circuit elements for developing differently timed threshold value, turn-on electric signals that are supplied to respective ones of the individual, static electronic switching devices.

A further object of the invention is the provision of improved, static electronic control circuits for multiple photoflash lamp assemblies having the above characteristics, and further including disenabling circuitry for discontinuing the buildup of charge on the capacitor charging circuitry upon one of the flashbulbs in the multiple array being flashed. The disenabling circuitry preferably is comprised of a current sensing device commonly connected to all of the flashbulbs for sensing the in-rush of current to a flashbulb upon a respective, static electronic switching device being turned on and a disenabling, static electronic switching device coupled to and controlled by the current sensing device and connected to the charging capacitor circuitry for discontinuing the supply of further charging current to the capacitor charging circuitry upon being turned on.

In practicing the invention, a family of new and improved static electronic control circuits is provided for use with multiple photoflash lamp assemblies of the type for reliably and selectively sequentially flashing at least one of an array of N flashbulbs with a start-flash electrical signal for initiating a flash of light from at least one of the flashbulbs. Preferably, N is a number greater than one, however, if desired, the control circuits can be used to flash only a single bulb. The static electronic control circuit comprises a plurality of individually operable, static electronic switching devices (preferably solid state, semiconductor, gate-controlled thyristor devices), there being at least one individually operable, switching device connected in circuit relationship with a respective flashbulb in the array for supplying electric current from a source of electric energy such as a dry cell battery, to the respective flashbulb. The static electronic control circuits are comprised by circuit enabling logic circuit means coupled to and controlling the turn-on of the individual, static electronic switching means. The circuit enabling logic circuit means comprises capacitor charging means for building up electric charge at a predetermined rate, and variable charge rate control circuit means coacting with the capacitor charging means to develop differently timed threshold value, turn-on electric signals for supply to different ones of the individual static electronic switching means. The static electronic control circuits preferably are fabricated at least in part in integrated circuit form and to the greatest possible extent, they are fabricated in monolithic integrated circuit form.

The family of new and improved, static electronic control circuits also preferably further includes disenabling circuit means for discontinuing the buildup of charge on the capacitor charging means upon one of the flashbulbs in an array being flashed. The disenabling circuit means is comprised of current sensing means (preferably a resistor) commonly connected to all of the flashbulbs for sensing the in-rush of current to a flashbulb upon its respective, static electronic switching means being turned on, and disenabling static electronic switching means coupled to and controlled by the current sensing resistor and connected to the capacitor charging means for discontinuing the supply of further charging current to the capacitor charging means upon being turned on. The disenabling static electronic switching means preferably comprises a solid state, semiconductor thyristor device and the static electronic control circuit means preferably further includes interrupting means for turning off the disenabling thyristor device following each operation of the static electronic control circuit.

By reason of the above briefly described new and improved static electronic control circuits for use with multiple photoflash lamp arrays, the invention makes available to the art a novel method of selectively flashing at least one of an array of N flashbulbs. This novel method comprises selectively sequentially flashing on the flashbulbs at some predetermined, ignition potential level, selectively sequentially building up the ignition potential level of each respective flashbulb at predetermined different rates, sensing the in-rush of current through one of the flashbulbs upon the same being flashed, and discontinuing the buildup of ignition potential level of the remaining unflashed bulbs in response to the current in-rush of a flashed bulb being sensed.

Other objects, features, and many of the attendant advantages of this invention will be appreciated more readily as the same becomes better understood by reference to the following detailed description, when considered in connection with the accompanying drawings, wherein like parts in each of the several figures are identified by the same reference character, and wherein.

Figure 1:
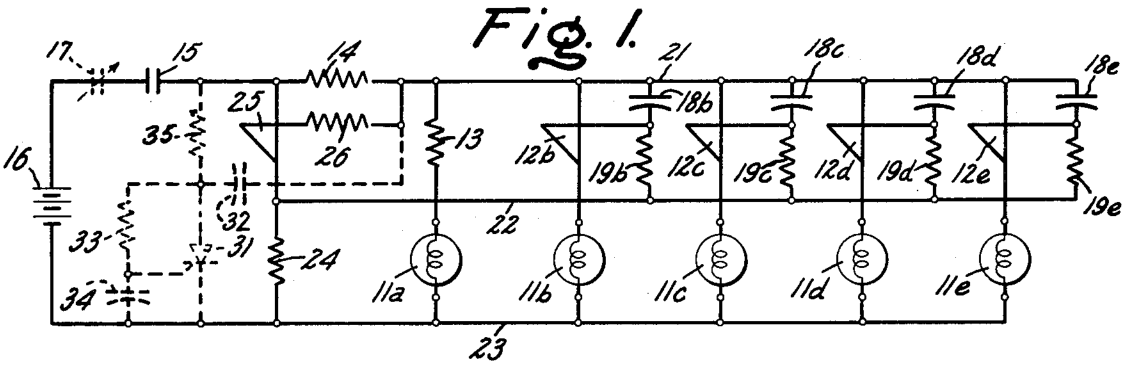
FIG. 1 is a detailed schematic circuit diagram of a preferred form of a new and improved, static electronic control circuit for multiple photoflash lamp assemblies constructed in accordance with the invention.

FIG. 1 is a detailed schematic circuit diagram of a preferred form of new and improved static electronic control circuit for a multiple photoflash lamp assembly for selectively sequentially firing at least one of a plurality of photoflash lamp bulbs such as shown at 11*a* through 11*e* in FIG. 1. The photoflash lamp bulbs 11*a*–11 may comprise any of the known photoflash lamp bulbs such as the General Electric AG–1 or the M2, or any other similar photoflash lamp bulbs. For a detailed description of the characteristics of such suitable photoflash lamp bulbs, reference is made to the publication entitled "Photolamp and Lighting Data, 1968," published by the Photolamp Department of the General Electric Company located at Nela Park, Cleveland, Ohio, and available to the public for the price of ten cents.

Each of the flashbulbs 11*b*–11*e* is connected in series circuit relationship with a respective static electronic switching means comprised by a solid state, semiconductor gate-controlled thyristor device 12*b*–12*e*. The thyristor devices 12*b*–12*e* may comprise any suitable form of switching semiconductor device such as transistors, unijunction transistors, etc., but preferably a device exhibiting thyristor characteristics, is employed. By a device exhibiting thyristor characteristics is meant a switching device which when turned-on, is maintained on or in its conducting condition until the current flowing through the device is reduced below some predetermined holding value. While any form of thyristor device could be employed in the circuit of FIG. 1 such as the well-known gate-controlled silicon controlled rectifier (SCR), the silicon controlled switch (SCS), the complementary silicon controlled rectifier (CSCR), etc., which are described in detail in the Silicon Controlled Rectifier Manual, 4th Edition, 1967, published by the Semiconductor Products Department of the General Electric Company, Electronics Park, Syracuse, New York. It is preferred however to utilize a General Electric silicon unilateral switch as the thyristor switching device 12*b*–12*e*. The General Electric silicon unilateral switch (SUS) is a silicon planar, monolithic integrated circuit having thyristor electrical characteristics closely approximately those of an ideal PNPN four-layer diode. The device is provided with a gate lead (preferably an anode gate lead) in order to obtain triggering at lower voltages, to eliminate rate effect, and to obtain transient free waveform. Such devices are manufactured and sold by the Semiconductor Products Department of the General Electric Company and identified as Product Numbers 2N4987 and 2N4990. For a more detailed description of the structure and characteristics of the SUS, reference is made to the application note issued by the Semiconductor Products Department of the General Electric Company in connection with the silicon unilateral switch. Alternatively, the semiconductor switching devices 12*b*–12*e* could be comprised by a device known as a programmable unijunction transistor (PUT) which is a general purpose low power triode thyristor device manufactured and sold by the Semiconductor Products Department of the General Electric Company possessing many desirable characteristics. Among these desirable characteristics are its high sensitivity, low leakage, capability of operating from low voltages (down to 3 volts), low cost and small size, and its ability to be manufactured in integrated circuit form. For a more detailed description of the PUT, reference is made to the application note published by the Semiconductor Products Department of the General Electric Company in connection with this device.

Figures 5, 6:
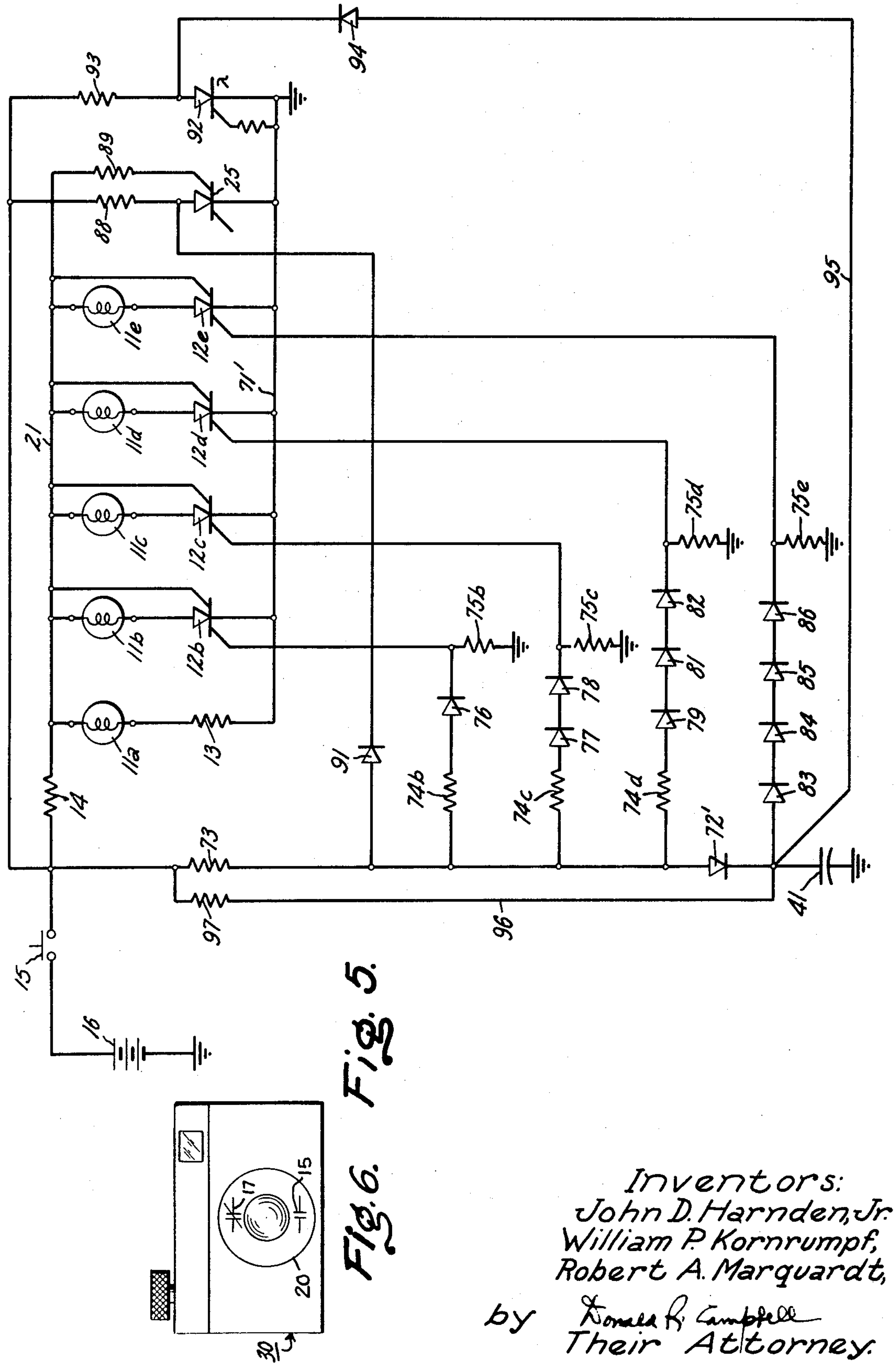
FIG. 5 is a detailed schematic circuit diagram of still a different form of the invention which employs a common charging capacitor.
FIG. 6 is a front view of a camera having a shutter mechanism provided with a switch for actuating a photoflash circuit.

It should be noted that only the flashbulbs 11*b*–11*e* are connected in series circuit relationship with respective associated SUSs 12*b*–12*e*, and that the first flashbulb 11*a* in the array is connected in series circuit relationship with a resistor 13. Each of the series circuits thus comprised is connected through a common sensing resistor 14 and through a set of camera shutter actuated contacts 15 across a low energy source of electric current 16, such as a dry cell battery, a barium titanate charging device and associated filter, or a small spring-wound electric generator and associated filter. It is assumed for the present purpose that the set of normally closed contacts indicated at 17 is not included in the circuit since it is an alternative form of the FIG. 1 circuit, as will be discussed hereinafter. FIG. 6 shows the switches 15 and 17 provided in the shutter mechanism 20 of a camera 30. The characteristics of the camera shutter actuated switching contacts 15 are such that these contacts close either simultaneously with the opening of the shutter of a camera with which the photoflash lamp assembly is used, or shortly thereafter. Upon the initial closure of the camera shutter actuated switch contacts 15 (prior to any of the flashbulbs 11*a*–11*e* being flashed) a closed current path will be established through the switch contacts, current sensing resistor 14, series resistor 13, and the first flashbulb 11*a* only. The remaining flashbulbs 11*b*–11*e* will not be energized due to the fact that the SUSs 12*b*–12*e* remain in their turned-off or nonconducting condition.

In order to turn on the additional flash lamps 11*b*–11 in a selective sequential manner, circuit enabling logic gating circuit means are provided. The circuit enabling gating circuit means is comprised by capacitor charging means formed by a plurality of individual charging capacitors 18*b*–18*e*, each of which is connected in series circuit relationship with a variable charge rate establishing charging resistor 19*b*–19*e*. Each of the series connected charging capacitors 18*b*–18 and their respective series connected charging resistors 19*b*–19*e* is connected between a set of supply terminals 21 and 22. The supply terminal 21 in conjunction with a third supply terminal 23 serves to connect the individual flashbulbs 11*a*–11*e* and their respective series connected resistor 13 and SUSs 12*b*–12 through the commonly connected sensing resistor 14 and camera shutter actuated switch contacts 15 across the power supply source 16 comprised by a dry cell battery. The middle supply terminal 22 is connected through a voltage dividing resistor 24 back across the power supply source 16 so that upon closure of the switch contacts 15, current paths are established to each of the charging capacitors 18*b*–18*e* through the individual charging resistors 19*b*–19*e* connected in common with the sensing resistor 14 and the voltage dividing resistor 24. Because of this arrangement, it will be appreciated that each of the charging capacitors 18*b*–18 will be allowed to build up electric charge at a rate determined by the capacitance value of each individual charging capacitor acting in conjunction with its own resistive charging path. Preferably, the capacitance values of the individual charging capacitors 18*b*–18*e* are selectively staggered so that each of the charging capacitors selectively builds up an electric charge sufficient to attain a predetermined threshold voltage value at selectively staggered times as determined by the RC charging time constant of the respective branch series circuits. Also, it is preferable that the attainment of the threshold voltage value be sequential in nature so that the charge on the capacitor 18*b* first attains the threshold value and subsequently 18*c*, 18*d*, etc., then sequentially likewise attains the threshold voltage value. The threshold voltage value built up across the individual charging capacitors 18*b*–18*e* is applied between the anode terminal and the anode gate terminal of the SUSs 12*b*–12*e*. Accordingly, upon the charging capacitor 18*b* being charged to its threshold voltage value (on the order of 0.6 of a volt), the SUS 12*b* will be turned on, thereby igniting its flash lamp 11*b*. Similarly, upon the charging capacitors 18*c*, 18*d*, etc., reaching their threshold voltage value, the respective SUSs 12*c*–12*e* will be turned on. The characteristics of the circuits are such that, if necessary, all of the charging capacitors 18*b*–18*e* can be selectively sequentially charged to the desired threshold voltage value within a time period of about one millisecond so that if necessary, all of the flashbulbs 11*b*–11*e* readily can be flashed within the normal open period (about one-thirtieth to one-fiftieth of a second) of a camera shutter.

Normally, it will not be desirable to flash all of the flashbulbs in the multiple array for each operation of the camera shutter actuated switch contacts 15, and it is desired that only a single flashbulb be flashed. For this reason, disenabling circuit means is provided for disenabling or discontinuing the gating on of any further unflashed flashbulbs upon one of the flashbulbs being energized. This disenabling circuit means preferably is comprised by an inhibiting SUS, solid state semiconductor gate controlled thyristor device 25 having its anode terminal connected to the juncture of the terminal of sensing resistor 14 with the switch contacts 15, and having its anode gate terminal connected through a limiting resistor 26 to the remaining opposite or low voltage end or terminal of sensing resistor 14. The cathode terminal of SUS 25 is connected back through voltage dividing resistor 24 to the low voltage or negative terminal of the battery source of supply 16. By this arrangement, it will be seen that the voltage developed across the current sensing resistor 14 is applied back through limiting resistor 26 across the anode and anode gate terminals of inhibiting SUS 25 to cause SUS 25 to be turned on upon the current flowing through sensing resistor 14 exceeding some predetermined value. Upon inhibiting SUS 25 being turned on, the device is connected in parallel circuit relationship with all of the charging capacitors 18*b*–18*e* and their associated charging resistors 19 *b*–19*e*, hence SUS 25 in its turned-on condition will collapse the voltage across these charging capacitors, thereby preventing any further charging of the capacitors and hence turn-on of any further of the SUSs connected to the capacitors.

The circuit arrangement shown in FIG. 1 operates in the following manner: It is assumed that upon initial operation of the circuit, none of the flashbulbs 11*a*–11*e* have been flashed. Upon the camera shutter actuated switch contacts 15 being initially closed, current will be supplied through the current sensing resistor 14 and series connected resistor 13 to the first flashbulb 11*a*. This results in flashing the first flashbulb 11*a*. Almost instantaneously with the flashing of flashbulb 11*a*, the in-rush of current to the flashbulb supplied through sensing resistor 14 will build up a sufficient voltage across sensing resistor 14 to cause the inhibiting SUS 25 to be turned on. Prior to turn-on of SUS 25, and subsequent to the closure of the camera shutter actuated switch contacts 15, all of the charging capacitors 18*b*–18 had been charging up towards the threshold voltage value through their associated charging resistors 19*b*–19*e*. However, upon SUS 25 being turned on (which occurs within a fraction of a microsecond following the flashing of the first flashbulb 11*a*) further charging of the capacitors 18*b*–18*e* towards their threshold voltage values is discontinued due to the shorting out effect of the now turned-on SUS 25. Hence, it will be appreciated that only the first flashbulb 11*a* will be selectively flashed upon the initial closure of the switch contacts 15. It is a characteristic of the photoflash bulbs employed that they exhibit an open circuit upon being flashed. Hence, it will be appreciated that upon any subsequent operation of the switch contacts 15, the circuit including the now flashed bulb 11*a* and series resistor 13 will exhibit an open circuit characteristic, and hence will have no effect upon the operation of the circuit. It is also assumed, that the camera shutter actuated switch contacts 15 exhibit the characteristics of staying closed for a period of about 30 milliseconds, and then automatically opening. This is a design characteristic of most camera shutter actuated switch mechanisms. Hence, it will be appreciated that upon the switch contact 15 automatically opening some 30 millisconds after their closure, the inhibiting SUS 25 will have its anode potential removed, and hence will turn off and revert to its quiescent blocking or nonconducting condition.

Upon the second selective closure of the camera shutter actuated switch contacts 15, as stated above the first flashbulb 11*a* will have been flashed so that it exhibits an open circuit characteristic. Hence, upon the second closure of the switch contacts 15, all of the charging capacitors 18*b*–18*e* will start charging towards their threshold voltage value. As set forth previously, the RC time constant of each of the charging capacitors 18*b*–18*e* is selectively staggered so that, for example, the charging capacitor 18*b* is charged to the threshold voltage potential in advance of the remaining charging capacitors 18*c*–18*e*. Upon this occurrence, the SUS 12*b* which has its anode gate connected to the juncture of the first charging capacitor 18*b* with its associated charging resistor 19*b* is turned on. Upon turn-on of the SUS 12*b*, its respective flashbulb 11*b* will flash. Almost instantaneously with the flashing of the second flashbulb 11*b*, the in-rush of current through the flashbulb and through sensing resistor 14 again turns on the inhibiting SUS 25. Again, turn-on of SUS 25 will prevent further charging up of the subsequent charging capacitors 18*c*–18*e;* hence, selectively firing only the second flashbulb 11*b* connected in series with the SUS 12*b*. This process is repeated on throughout the chain of remaining unflashed flashbulbs 11*c*–11*e* until each flashbulb is selectively flashed, preferably in a sequential manner. It should be expressly noted, however, that in order to disenable the flashing of further unflashed bulbs, it is necessary for the circuit to detect the in-rush of current produced upon the flashing of a light bulb. Accordingly, it will be appreciated that in the event that there are any defective bulbs in the array of flashbulbs 11*a*–11*e*, which will not flash due to the fact that the filament is broken, etc., so that current does not flow through the flashbulbs, the existence of the defective flashbulb does not prevent the actuation of flashing of a further flashbulb in the array.

For example, assume that the second flashbulb 11*b* in the array is defective so that it is incapable of being flashed because of an open filament. Under these circumstances, upon the actuation of the switch contacts 15 following the prior flashing of the first flashbulb 11a in the array, all of the charging capacitors 18*b*–18*e* will start charging towards the threshold voltage value. Again, the first charging capacitor 18*b* will be charged to the threshold voltage value in advance of the other charging capacitors due to its faster RC charging time constant. However, due to the fact that its respective flashbulb 11*b* has been assumed to be a defective bulb which is incapable of being flashed, attainment of the threshold voltage value has no effect since the open circuit nature of the defective flashbulb 11*b* prevents current flow through the circuit branch path comprised by the SUS 12*b* and the defective flashbulb 11*b*. Under these conditions, no in-rush of current to the flashbulb will be sensed by the sensing resistor 14. Accordingly, inhibiting SUS 25 will not be turned on, and hence the remaining charging capacitors 18*c* through 18*e* will be allowed to continue to charge towards the threshold potential level. Consequently, only a short time period (normally 50 to 100 microseconds later) the second charging capacitor 18*c* in series will attain its threshold voltage level, and will fire or turn on its respective SUS 12*c*. This results in flashing of the flashbulb 11*c* that is connected in series with the SUS 12*c*. Upon flashing of the next flashbulb 11*c* in the series, the circuit then will operate normally to turn on inhibiting SUS 25 and prevent the flashing of any further unflashed bulbs in the array in the manner described above. It will be appreciated, however, that due to the high speed of response of the circuit, the picture frame that was to have been taken at the time of closure of the switch contacts 15 still will be saved since a flash will have been produced by the flashbulb 11*c* in spite of the originally scheduled flashbulb 11*b* being defective. If necessary, even the unlikely condition that all of the first four flashbulbs 11*a*–11*d* turn out to be defective, the fifth flashbulb 11*e* in the array still can be flashed within the normal open time period of a camera shutter so that the probability of shooting a picture is greatly enhanced.

In the embodiment of the invention shown in FIG. 1 of the drawings, it is anticipated that substantially all of the circuit components will be fabricated either in hybrid integrated circuit form or in thick film monolithic circuit form. For this purpose, those components which are susceptible to fabrication using integrated circuit techniques have been redrawn in FIG. 2 of the drawings wherein it can be seen that substantially all of the circuit components are integratable with the exception, of course, of the flashbulbs 11*a*–11*e*. By designing the charging capacitors 18*b*–18*e* to have sufficiently low capacitance value and appropriately proportioning the series charging resistors 19*b*–19*e*, all of these components can be fabricated, using monolithic integrated circuit techniques such as those described in the textbook entitled "Screen Printing of Microcircuits," written and compiled by Daniel C. Hughes, Jr., and published by the Dan Mar Publishing Company of Summerville, New Jersey, copyright 1967. However, if desired the circuit arrangement of FIGS. 1 and 2 can be manufactured using discrete components but for reasons of low cost, improved reliability and small size, it is preferred that the circuit be manufactured in monolithic integrated circuit form.

Figure 2:
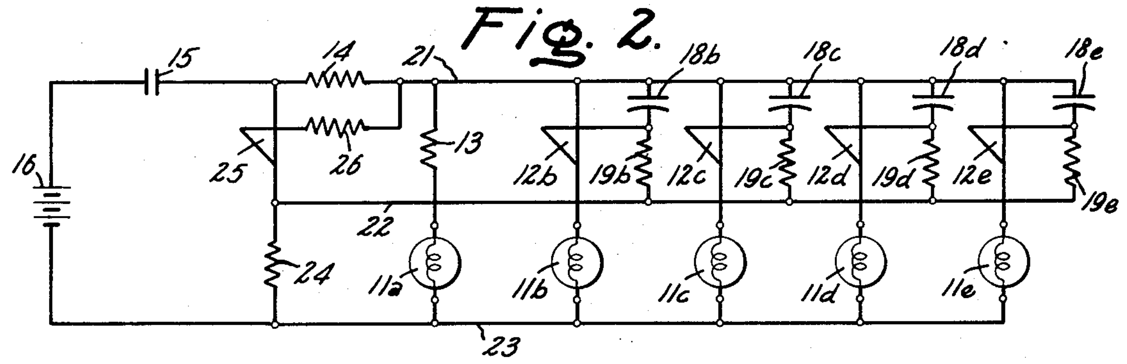
FIG. 2 is a detailed circuit diagram of a slightly modified form of the control circuit shown in FIG. 1, and which is susceptible of being manufactured almost entirely by integrated circuit manufacturing techniques.

The circuits shown in FIGS. 1 and 2 may be designed into a separate photoflash attachment to be secured to a camera or alternatively, the circuit may be incorporated into a suitably designed camera for use with a discardable photoflash attachment. To assure proper operation of the circuit, as well as other control circuits described herein, suitable fusing devices can be connected in each flashbulb circuit branch. If the particular camera with which the circuit shown in FIGS. 1 and 2 is intended to be used, does not incorporate a suitable camera shutter actuated switch 15 which has the characteristics of being maintained closed for a period of about 30 milliseconds and then opening, suitable alternative arrangements can be provided for assuring that the inhibiting thyristor device 25 is turned off after each operation of the static electronic control circuit. For this purpose, an additional normally-closed set of switch contacts 17 may be included in the manner shown in FIG. 1, and which are designed automatically to open a predetermined time period (30 milliseconds) after the closure of the main camera shutter actuated switch contacts 15. There are many commercially available cameras which have been designed into them suitable paired combinations of normally-open and normally-closed switch contacts 15 and 17 which readily can be accommodated to use with the static electronic control circuits shown in FIGS. 1 and 2.

In addition to the above-mentioned alternative arrangement utilizing combinations of normally-open and normally-closed switch contacts, if desired, the circuit of FIG. 1 can be modified to include an additional commutating thyristor device such as shown at 31 and series resistor 35 which are connected in parallel circuit relationship across the inhibiting SUS thyristor device 25 and its series connected resistor 24. A commutating capacitor 32 is connected between the anode of the commutating SCR 31 and the low voltage end of the current sensing resistor 14. Gating signals for supply to the gating electrode of commutating SCR 31 are derived from a series connected resistor 33 and capacitor 34 connected across the SCR 31 and having the juncture thereof connected to the gating electrodes of commutating SCR 31. Such a commutating arrangement would be used only in conjunction with a set of camera shutter actuated switch contacts which upon being closed, remain closed until a user of the camera physically opens the switch contacts. To accommodate camera shutter actuated switches of this nature, the commutating SCR 31 and its associated circuit components described briefly above would be employed.

Figure 3:
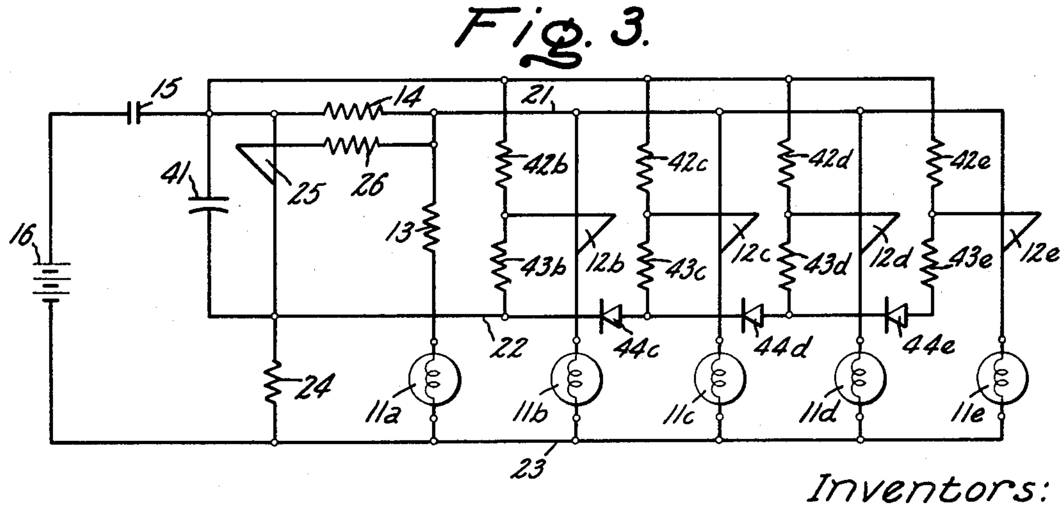
FIG. 3 is a detailed schematic circuit diagram of still a third form of the invention which utilizes a common charging capacitor in place of individual charging capacitors employed in the circuit arrangements of FIGS. 1 and 2.

FIG. 3 is a detailed schematic circuit diagram of an embodiment of the invention which utilizes a commonly connected capacitor 41 as the capacitor charging means for deriving the threshold value firing potential used to selectively turn on the SUS thyristor switching devices **12*b*–12*e* that in turn ignite or flash the respective flashbulbs 11*b*–11*e*. In order to accommodate the common charging capacitor 41, a member of voltage dividing series connected resistors 42*b*–42*e* and 43*b*–43*e* are connected in parallel circuit relationship across the common charging capacitor 41. The juncture of the respective series connected voltage dividing resistors 42*b*–43*b*, 42*c*–43*c*, etc., is connected to the anode gate terminal of a respective SUS thyristor switching device 12*b*, 12*c*, etc. The resistance values of each set of voltage dividing resistors 42*b*–43*b*, 42*c*–43*c*, etc., is adjusted so that the potential at the juncture thereof varies between each set in accordance with the RC time constant of each respective network thus formed. Accordingly, the juncture of each set of series connected voltage dividing resistors 42*b*–43*b*, 42*c*–43*c* will rise to the necessary threshold firing potential value at selected different times following closure of the camera shutter actuated switch 15. In addition, semiconductor diode devices shown at 44*c*, 44*d*, and 44*e* are introduced between each set of series connected voltage dividing resistors so as to in effect introduce additional dropping voltages (accounted for by the forward voltage drop of the added diode) into the circuit connections intermediate the common charging capacitor 41 and a respective set of voltage dividing resistors such as 42*c*–43*c*. These voltage drops add a precise threshold voltage increment to each of the SUS 12*b*–12*e* anode gate threshold voltages previously mentioned. Further, the semiconductor diodes also serve to isolate the several respective gating circuits for the SUS thyristor switching devices 12*b*–12*e***.

In operation, the circuit of FIG. 3 functions in much the same manner as the circuit shown in FIGS. 1 and 2. Upon closure of the camera shutter actuated switch contacts 15, the common charging capacitor 41 will be charged through the resistor 24 towards the voltage of the energy source 16 which preferably comprises a dry cell battery and functions as a common timing voltage ramp generator. As the voltage of the common charging capacitor 41 rises toward the value of source 16, the voltage level at the juncture of each of the series connected resistors **42*b*–43*b*, 42*c*–43*c*, etc., also rises. The rise in potential level at each of the junctures is determined by the effective resistance of the individual circuits. Since the effective resistance of the individual circuits are staggered in value, that circuit having the lowest resistance value will attain the threshold firing potential of its associated SUS thyristor device first. Assuming that none of the flashbulbs 11*a* through 11*e* have been flashed, then upon initial closure of the switch contacts 15, the first flashbulb 11*a* will be flashed. Upon flashing of the first flashbulb 11*a*, the inrush of current to this flashbulb will be sensed by sensing resistor 14 and will operate through resistor 26 to turn on the inhibiting SUS thyristor device 25. Since SUS 25 is connected in parallel with the common charging capacitor 41, upon this device being turned on, any further charging of the capacitor 41 is prevented. Accordingly, none of the further unflashed bulbs 11*b*–11*e* will be flashed. Some 30 milliseconds later, the switch contacts 15 automatically will open since it is assumed that this is a characteristic possessed by the switch contacts 15**.

Upon the next closure of the camera shutter actuated switch contacts 15, the flashbulb **11*a* will have been used so that it exhibits an open circuit characteristic. Accordingly, the charging capacitor 41 will be allowed to continue to charge until the potential at the juncture of the first set of resistors 42*b* and 43*b* attains a value sufficient to turn on the SUS thyristor switching device 12*b*. Upon this occurrence, bulb 11*b* will be flashed, and the in-rush of current to the flashbulb will cause inhibiting SUS device 25 to turn on and discontinue further charging of the capacitor 41. This same process will be continued on throughout the chain of flashbulbs in substantially the same manner as was described with relation to the circuits shown in FIGS. 1 and 2. It should be noted however, that intermediate each of the sets of voltage dividing resistors 42*b*–43*b* and 42*c*–43*c*, for example, an additional semiconductor diode such as 44*c* is interposed to introduce an additional voltage dropping resistance into the circuit path between the common charging capacitor 41 and the juncture to which the anode gate terminal of the associated SUS thyristor switching device, is connected. As a consequence, the voltage dividing ratio of the respective gating circuit is varied from stage to stage so that selective sequential flashing of the respective flashbulbs is attained. In the event that any prior bulb is defective and will not operate due to an open filament, the firing of a subsequent bulb will be assured due to the continued buildup of charge in the common charging capacitor 41 in the same manner as was described previously in connection with the circuits shown in FIGS. 1 and 2. If desired, the additional semiconductor diodes 44 *c* through 44*e* could be eliminated, and staggered resistor dividers used in their place, however, this would tend to complicate the problem of matching impedance values for the several stages plus maintaining a prescribed charging rate on the common capacitor 41. The circuit arrangement shown in FIG. 3** is preferred, however, since the added diode drops between each flashbulb circuit branch insert a measure of isolation between the circuit branches and assure proper sequential selective firing of each flashbulb. Further use of a common charging capacitor as a single timing voltage ramp generator eliminates multiple time delays together with their associated problem of maintaining tolerances quite closely. Use of resistor ratios in the voltage dividing resistor networks also simplies fabrication of the circuit using state of the art monolithic integrated circuit fabrication techniques.

In the circuit arrangements of FIGS. 1 through 3, anode fired (commonly connected anodes) SUS thyristor switching devices are employed. By very simple circuit design changes, the circuits shown in FIGS. 1–3 can be inverted to employ cathode fired (commonly connected cathodes) thyristor devices without departing from the spirit of the invention as would be obvious to one skilled in the art of electronic circuitry. Further, should it be desired to use light activated thyristor switching devices in place of the gate fired SUS thyristor devices shown, such an arrangement is entirely feasible; however, it would be necessary to so arrange the light activated thyristor switching devices so that the light used to turn on the devices is selectively applied only to one of the devices at a time. Even in the event that such modification to the circuits of FIGS. 1–3 is used, the circuits still possess the desirable characteristics enumerated above, namely, the ability to be manufactured entirely in integrated circuit form using either hybrid integrated circuit structures, or monolithic integrated circuit design techniques. This allows the circuits to be mass produced at extremely low cost with a resultant small size and high reliability. In addition, the circuits function in such a manner that in the event of one of the flashbulbs in the multiple array being defective because of a broken filament, etc., flashing of the remaining bulbs in the array will take place normally without causing the entire circuit to hang up and cease operating. Further, in the event that one of the flash-bulbs is of the type known as an "airbulb," such a bulb nevertheless will be operated and will function in substantially the same manner as a normal flashbulb (the only exception being that no flash of light will be emitted since such airbulbs have lost their oxygen content and emit only a very low level light). The static control circuits shown in FIGS. 1–3 nevertheless will sense the ignition of such "airbulbs" and will proceed in a normal manner to flash subsequent unflashed bulbs during subsequent operations of the circuit. Proper operation of the circuit with any kind of defective flashbulb can be further assured by the inclusion of suitable fusing devices in each flashbulb circuit branch and Serial No.

Figure 4:
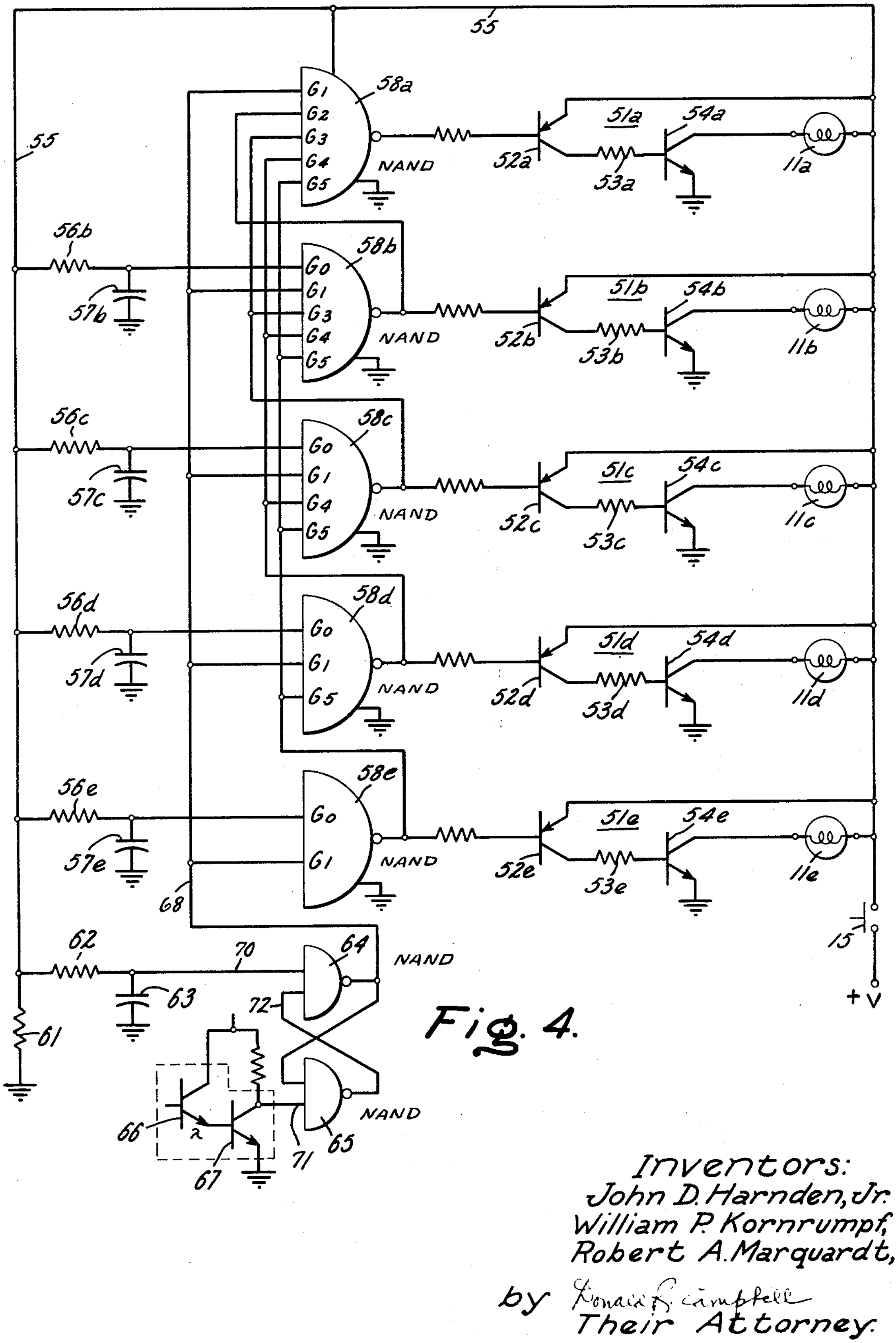
FIG. 4 is a detailed schematic logic circuit diagram of a form of the invention which utilizes digital logic circuit elements.

FIG. 4 is a detailed logic circuit diagram of a different form of static electronic control circuit suitable for use with multiple photoflash lamp assemblies. In the control circuit arrangement shown in FIG. 4, a plurality of photoflash lamps shown at **11*a*–11*e* are selectively sequentially flashed by means of static solid state semiconductor switching means 51*a*–51*e* upon each closure of a camera shutter actuated switch shown at 15. Each of the flashbulb switching means 51*a*–51*e* is comprised by a pair of interconnected PNP transistors 52*a*–52 having the collector electrodes thereof connected through limiting resistors 53*a*–53*e* to the base electrode of a plurality of NPN transistors 54*a*–54*e*. Each of the NPN transistors 54*a*–54*e* has its emitter electrode grounded and its collector electrode connected through the filament of a respective flashbulb 11*a*–11 to a power supply terminal 55 that is designed to be connected to a low energy source of electric current upon closure of the camera actuated switch contacts 15**.

The power supply terminal 55 is connected through a plurality of respective charging resistors **56*b*–56*e* which are connected in circuit relationship with a plurality of different capacitance value charging capacitors 57*b*–57, respectively. The juncture of the resistance-capacitor charging networks comprised by each of the resistors 56*b*–56*e* and its associated charging capacitor 57*b*–57 is connected to a suitable $G_0$ input of conventional, commercially available NAND logic gates 58*b*–58. The output terminals of the NAND logic gates 58*b*–58*e* are supplied to the base electrodes of the respective PNP switching transistors 52*b*–52*e* for selectively sequentially turning on these transistors to thereby flash the respective flashbulbs 11*b*–11*e*** associated therewith.

The power supply terminal 55 is also connected to one terminal of a load resistor 61 which has its remaining terminal grounded and which is connected across a resistor-capacitor triggering circuit comprised by a resistor 62 and capacitor 63. The juncture of the triggering network 62, 63 is connected to an input terminal of a conventional, commercially available flip-flop circuit comprised by a pair of interconnected NAND gates 64 and 65. The flip-flop comprised by NAND gates 64, 65 has a remaining input terminal connected to the output from a two stage light activated amplifier circuit comprised by a pair of interconnected NPN transistors 66 and 67 with the transistor 66 being a light activated transistor for developing a switching potential that is supplied to the second input terminal of the flip-flop comprised by interconnected NAND gates 64, 65.

The output 68 from the flip-flop comprised by the interconnected NAND gates 64, 65 is connected to the $G_1$ input terminal of all of the NAND gates **58*a*–58*e*. The output terminal of the NAND gate 58*e* is connected to the $G_5$ input terminal of all of the NAND gates 58*a*–58*d*, the output terminal of NAND gate 58*d* is connected to the $G_4$ input terminals of all of the NAND gates 58*a*–58*c*, the output of NAND gate 58*c* is connected to all of the $G_3$ input terminals of the NAND gates 58*a* and 58*b*, and the output of NAND gate 58*b* is connected to the $G_2$ input terminal of NAND gate 58*a*. As stated previously, the output terminals of all of the NAND gates 58*a*–58*e* also are connected to the base electrodes of the PNP switching transistors 52*a*–52*e* for switching these transistors into a conducting condition thereby flashing the respective flashbulbs 11*a*–11*e***.

In operation, the digital logical static electronic control circuit shown in FIG. 4 functions in the following manner. The NAND gates **58*a*–58*e*** all operate in accordance with positive logic wherein a logical one level output signal is obtained from the output of the NAND gates 58a–58e in the event that one or more input gates are supplied with a logical zero level input signal. A logical zero level signal is produced at the output of the NAND gates only when all of the inputs are at the logical one level. The production of a logical zero level output signal in the output of NAND gates 58a–58e will serve to turn on the respective PNP transistor 52a–52e and thereby flash the associated flashbulb 11a–11e. Also, the flip-flop comprised by the interconnected NAND gates 64, 65 initially is conditioned by the clamping action of capacitor 63 so that a logical one level signal appears at its output terminal 68 and is supplied to the $G_1$ input terminals of all of the NAND gates 58a–58. The flip-flop is caused to shift or change its condition to a logical zero potential level output signal at terminal 68 only when a logical zero potential level input signal is supplied thereto from the light triggered transistors 66, 67.

Assume that the digital logical control circuit for the photoflash assembly shown in FIG. 4 is in its initial condition where none of the flashbulbs 11a through 11e have been flashed. Upon the camera shutter switch 15 being closed, logical one potential level enabling signals are supplied to the $G_1$ input terminals of all of the NAND gates 58a through 58d from the flip-flop combination of NAND gates 64 and 65 whose output 68 is initially set at a logical level by the clamping action of capacitor 63. However, due to the fact that all of the charging capacitors 57b through 57e are discharged and at ground potential, logical zero signals are supplied to the $G_0$ input terminals of all of the NAND gates 58b through 58d. As a consequence, logical one level output signals are produced at the output terminals of all of the NAND gates 58b through 58e. Accordingly, all of the inputs $G_1$ through $G_5$ of the first NAND gate 58a are provided with logical one enabling input potentials which enables.

NAND gate 58a immediately switches to its logical zero level output condition due to its preconditioning described above, and results in turning on PNP transistor 52a that in turn turns on NPN transistor 54a and flashes the first flashbulb 11a. In the interim, the charge on capacitor 63 has rapidly built up to the logical one potential level so that the input terminal 70 of the NAND gate 64 has supplied to it a logical one level input. The flash of light produced by the flashing of the first flashbulb 11a triggers light transistor 66 into a conducting condition and turns on transistor 67. This results in switching the level of the input terminal 71 of the NAND gate 65 to a logical zero level enabling the output of NAND gate 65 to assume a logical one level signal that is applied to the input terminal 72 of NAND gate 64. Accordingly, the NAND gate 64 will assume its opposite condition whereby a logical zero level output signal appears at the output terminal 68 which completes a stable change in state of the flip-flop combination of NAND gates 64 and 65. This logical zero level signal is applied to the $G_1$ input terminal of all of the NAND gates 58a through 58e thereby disenabling these NAND gates and preventing the firing of any further flashbulbs due to the buildup of charge on the charging capacitors 57b through 57e. It should be noted at this point that the RC time constants of the charging network comprised by the resistors 56b through 56e and capacitors 57b through 57e are such that the charging networks attain the logical one potential sequentially starting from 56b–57b down through 56e–57. The time interval determined by the difference in time constants of two successive RC charging networks is greater than the time required for sensing transistor 66 to sense a successfully flashed bulb. Accordingly, all of the NAND gates 58a through 58e will be disenabled due to the prior appearance of the logical zero level input signals on the $G_1$ input terminals prior to the flashing of any further of the flashbulbs 11b through 11e. Subsequent to all of this, the switch contacts 15 automatically will open thereby removing power from the circuit, and allowing the circuit to return to its initial quiescent condition.

Upon the next closure of the switch contacts 15, the flip-flop 64, 65 will be reset to its logical level one output condition by capacitor 63 so that again all of the $G_1$ input terminals of NAND gates 58a through 58e will be at logical one level. Again, all of the input terminals of NAND gate 58a will be at logical one level allowing it to switch to its logical zero level output condition instantaneously turning on transistors 52a and 54a; however, due to the fact that the flashbulb 11a already has been flashed, transistors 66 and 67 will remain off or in their non-conducting state. As a result, charging of the capacitors 57b through 57e will continue. Since the charging network 56b, 57b has the shortest time constant, the potential on capacitor 57b attains the logical one potential level first, thereby the $G_0$ input terminal of NAND gate 58b will assume a logical one level. This results in switching NAND gate 58b to its logical zero level output condition which is applied to its logical zero level output condition which is applied to the $G_2$ input of NAND 58a and also turns on transistors 52b and 53b and results in flashing a second flashbulb 11b. The logical zero level applied to the $G_2$ input of NAND 58a causing it to change state to a logical one level thereby turning off transistors 52a and 54a while transistors 52b and 54b are on reducing the circuit power consumption during the firing of bulb 11b. Thereafter, the flash of light emitted by flashbulb 11b is sensed by transistor 66 which then switchs flip-flop combination of NAND 64, 65 to its logical zero output condition. This results in disenabling all of the NAND gates 58a through 58e so as to prevent any further firing of the unflashed bulbs 11c through 11e as described above. Further operations of the camera shutter actuated switch contacts 15 functions in a similar manner to flash each of the remaining flashbulbs 11c through 11e in a selected, sequential manner. It should be noted, however, that in the event there is a defective flashbulb which does not produce a sufficient light flash at an appropriate time in the operation of the circuit, the next succeeding flashbulb will be flashed since sensing transistor 66 will not flip the flip-flop combination of NAND 64, 65 to inhibit the NAND gates 58a–58e, allowing the next NAND gate to assume its logical zero state upon its associated input capacitor 57 reaching the logical one level.

In fabricating the embodiment of the invention shown in FIG. 4 of the drawings, it is desirable to employ as many unitized structures as possible. For this purpose, the family of solid state semiconductor networks manufactured and sold by the Texas Instruments Company of Dallas, Texas, and identified as their "-Diode-Transistor Logic (DTL) Networks for Digital Systems" can be employed. These networks can be interconnected in the manner shown in FIG. 4 to provide a highly desirable, digital logic static electronic control circuit for use with multiple flash lamp assemblies as taught by the present invention.

In addition to its digital, logical character, the circuit of FIG. 4 is interesting because of another operational characteristic which it possesses. This characteristic in a sense guarantees the production of a light flash for each operation of the camera shutter actuated switch contacts 15. This guaranteed flash stems from the ability of the circuit to continue to charge the next successive charging capacitor up to the logical one firing potential of its associated NAND gate unless its action is inhibited by switching of the flip-flops 64, 65 from its logical one to its logical zero output condition by the sensing of a light flash with the light activated transistor 66. Thus, if a particular flashbulb which should have produced a flash of light fails to produce a flash of light, the light activated transistor 66 will not be turned on thereby leaving the circuit in the condition whereby the next successive NAND gate remains in its logical one enabled condition, and hence susceptible to being switched by the buildup in potential on its charging capacitor to the logical one potential triggering level. This characteristic can be extremely valuable in cases where the defective flashbulb happens to be what is known as an "airbulb." An airbulb is a flashbulb which has lost its seal so that the pressurized oxygen contained in the bulb has leaked out. Bulbs of this nature will burn the filamentry material contained in the bulb, but because of the lack of the pressurized oxygen, only a dim amount of light is put out. By appropriate adjustment of the light activated transistor 66, it can be made to respond only to legitimate light flashes thereby assuring or guaranteeing the production of a light flash so long as there remains at least one un-flashed bulb in the array. With this circuit it is also possible to use fusing devices to assure opening of each flashbulb circuit branch.

FIG. 5 is a detailed circuit diagram of still another form of static electronic control circuit constructed in accordance with the invention. In the embodiment of the invention shown in FIG. 5, a plurality of photoflash bulbs *11a–11e* are connected in series circuit relationship with a respective gate turn-off thyristor device known as a silicon control switch *12b–12e*. The respective series connected flashbulbs *11b–11e* and their associated SCSs *12b–12e* are connected in series circuit relationship between a grounded supply terminal 71′ and a power supply terminal 21 that is connected through a common current sensing resistor 14 and switch contact 15 to the positive terminal of a battery source of electric energy 16. The first flashbulb 11a is connected in series with a limiting resistor 13 rather than with an SCS as are the remaining flashbulbs *11b*–11. The SCS devices *12b–12e* are conventional, commercially available silicon control switches such as those described in the General Electric Transistor Manual, Seventh Edition, 1964, published and sold by the Semiconductor Products Department of the General Electric Company located at Electronics Park, Syracuse, New York. The SCS is a four terminal device wherein two of the terminals are gating terminals. One of the gate terminals of each device, hereafter referred to as the gating on terminal is connected to a suitable, associated gating circuit to be described hereinafter, and the remaining gating terminal called the turn-off gate is connected to the power supply terminal 21 to eliminate spurious anode triggering.

The turn-on gating electrodes of the respective SCSs *12b*–12 are connected to a common charging capacitor 41 having one of its plates grounded and the remaining plate connected through a blocking diode 72′ and charging resistor 73 back to the power supply terminal 21.

The positive terminal of the common charging capacitor 41 which is connected through charging resistor 73 to the positive power supply terminal 21 also is connected across a first resistive dividing network comprised by a pair of series connected resistors *74b* and *75b* connected in series circuit relationship with a single semiconductor diode 76. The juncture of the diode 76 with the resistor *75b* is connected to the turn-on gating electrode of the first SCS *12b*. The turn-on gating electrode of the SCS *12c* similarly is connected to a second resistive dividing network comprised by resistors *74c* and *75c* connected in series with two semiconductor diodes 77 and 78. Similarly, the turn-on gating electrode of SCS 12d is connected to a three semiconductor diode resistive dividing network further comprised by resistors *74d* and *75d*, and the turn-on gate of SCS *12e* is connected to a four semiconductor diode resistive dividing network further comprised by a resistor *75e*. The resistive dividing networks are all connected in parallel across the common charging capacitor 41 and are designed in such a manner that additional diode drops are introduced between the turn-on gate of the successive SCS devices and the common charging capacitor 41. By reason of this arrangement, the SCS *12b* will be turned on first since it has only a single diode drop introduced between the common charging capacitor 41 and its turn-on gate. The SCS *12c* will be turned on second since it introduces only two diode drops, the SCS *12d* three, and the SCS *12e* four. This provides a form of staircase threshold level triggering for the several SCS devices *12b–12e*.

In addition to the SCS devices *12b–12e* an inhibiting SCS device 25 is provided which is connected between ground and through a current limiting resistor 88 back to positive or high voltage end of the current sensing resistor 14. The inhibiting SCS 25 has its turn-off gate (otherwise known as an anode gate) connected back through a current limiting resistor 89 to the negative or low voltage end of the current sensing resistor 14. By reason of this arrangement, the voltage drop appearing across the current sensing resistor 14, and produced as a result of the in-rush of current to a flashbulb switches the SCS 25 from its non-conducting, blocking condition to its conducting condition. The anode of the inhibiting SCS 25 is coupled back through a coupling diode 91 to the juncture of charging resistor 73 with blocking diode 72 so that upon being turned on, inhibiting SCS 25 serves to limit the charging current into capacitor 41 to that supplied by resistor 97, and prevent it from rapidly charging to a higher potential level.

In addition to the above-described circuit components, the static electronic control circuit shown in FIG. 5 further includes a light activated SCS 92 which has its cathode grounded and its anode connected through a current limiting resistor 93 back to the positive or high voltage end of the current sensing resistor 14. The anode of the light activated SCS also is connected back through a coupling diode 94 and conductive path 95 to the positive plate or terminal of the common charging capacitor 41. This positive plate of common charging capacitor 41 is also connected through a second charging path 96 and high resistance value charging resistor 97, and switch contacts 15 (when they are closed) across the battery source of electric energy 16. The arrangement is such that upon a flashbulb 11*a*–11*e* being flashed, the light activated SCS 92 will be rendered conductive and will serve to clamp the common charging capacitor 41 from any further trickle-charging through the high resistance second charging path 96, 97. However, in the event that no light flash is detected, LASCS 92 will remain non-conducting and will allow the trickle-charge through 96, 97 to build up the potential of common charging capacitor 41 to a value sufficient to fire the SCS device 12*e* through its associated four semiconductor diode gate firing network. The blocking diode 91 isolates the charging capacitor 41 from clamping action by SCS 25, and allows trickle-charge to continue on capacitor 41 through resistor 97 so that it can eventually trigger SCS 12*e*. Accordingly, it will be appreciated that in the event that any of the prior flashbulbs 11*a*–11*d* turn out to be bad through a short-circuited filament, or even in the event that they turn out to be "airbulbs" so that no flash of light is produced, the circuit operates to assure flashing of at least the fifth flashbulb 11e by its associated SCS 12*e*.

In operation, the embodiment of the invention shown in FIG. 5 functions in the following manner. It is assumed that the camera shutter actuated switch contacts 15 are of the type which upon being closed will remain closed to keep the circuit energized for a predetermined period of about 30 milliseconds which corresponds to the normal-open period of the shutter mechanism of most cameras. It is also assumed that none of the flashbulbs 11*a*–11*e* previously have been flashed. With the circuit thus conditioned, upon the initial closure of the camera shutter actuated switch contacts 15, flashing current will be supplied directly to the first flashbulb 11*a* through current sensing resistor 14 and limiting resistor 13. Assuming that the flashbulb 11a is a good one, and gives off a flash of light, in-rush of current to the flashbulb 11*a* will be sensed by the inhibiting SCS 25 which then is turned on and limits the current to charging capacitor 41 to that supplied by resistor 97. Due to the increased voltage drop introduced by the semiconductor diode 76, this potential will not be sufficiently high to trigger on the SCS 12*b* whose turn-on flashes the next flashbulb 11*b*. Shortly thereafter, the light activated SCS 92 senses the flash of light produced by flashbulb 11*a* and clamps the capacitor 41 from further trickle-charging through the high resistive path 97 thus, flashing of the fifth flashbulb 11*e* will be prevented, and the circuit will remain in this condition until the contacts 15 automatically open at the end of the previously mentioned 30 millisecond holding period.

Next assume that the flashbulb 11*a* is a defective bulb due to the fact that it has a broken filament and exhibits an open circuit characteristic. Under these conditions, no in-rush of current will be sensed by the current sensing resistor 14 so that the inhibiting SCS 25 is not turned on. Consequently, with SCS 25 maintained off, the common charging capacitor 41 will continue to charge rapidly towards the voltage value of the source 16. At some predetermined time, after the closure of the contacts 15, capacitor 41 will have charged to a sufficient voltage value to turn on the SCS 12*b* through its single semiconductor diode voltage dividing network. Upon this occurrence, the flashbulb 11*b* will be flashed. Upon flashing of flashbulb 11*b*, the in-rush of current to the flashbulb will be sensed by sensing resistor 14, turn on SCS inhibiting switch 25 and clamp the charging capacitor 41 from any further charging through the resistor 73. A short time thereafter, the LASCS 92 will be turned on by the flash of light so as to prevent any further trickle-charging of capacitor 41 through high resistive path 97. Hence, under these circumstances, again the fifth flashbulb 12*e* will not be fired. Assuming thereafter that all of the remaining flashbulbs are good, then the circuit will cycle through each operation determined by the closure of the switch contact 15 in a similar manner to that described above with relation to the flashing of the first flashbulb 11*a*. Upon the last flashbulb 11*e* being flashed in this manner, all of the flashbulbs must then be replaced so as to condition the circuit for futher operation.

In the event that one of the flashbulbs turns out to be an airbulb, the further charging of capacitor 41 through resistor 73 will be discontinued due to the fact the the current sensing resistor 14 will sense the in-rush of current to the airbulbs since its filament forms a closed circuit path with the associated switching SCS. However, no flash of light will be produced. Since no flash of light is produced, the LASCS 92 will remain turned off, thereby allowing the trickle-charging of capacitor 41 to continue through the high resistance path 97. As a consequence, the capacitor 41 ultimately will be charged up to a value sufficient to turn on the last SCS 12*e* through the diode string 83–86. The parameters of the circuit are adjusted in a manner such that firing of the last SCS 12*e* in this manner occurs prior to the termination of the 30 millisecond, normal open period of the camera shutter. Hence, it will be appreciated that the assurance of at least the flashing of the last flashbulb 12 *e* can be provided under circumstances where one of the prior flashbulbs is an "airbulb." However, in the event that there are two airbulbs in the array, then the fifth flashbulb 11*e* will have been flashed in connection with the first detected airbulb, and no back-up protection is provided for additional airbulbs in the array.

From the foregoing description, it will be appreciated that the invention provides a family of new and improved static electronic control circuits for use in conjunction with electronically operable, multiple photoflash lamp assemblies. The new and improved static electronic control circuits are comprised by a plurality of individually operable, static electronic switching devices of the solid state semiconductor thyristor type for individually controlling current flow through respective flashbulbs in a multiple array. The control circuits further include circuit enabling means for controlling turn-on of the respective switching devices with the circuit enabling means being comprised by capacitor charging circuitry used in conjunction with the other variable charge rate circuit elements for developing differently timed threshold value turn-on electric signals that are supplied to respective ones of the individual static electronic switching devices. The control circuits also preferably further include inhibiting or disenabling circuitry for discontinuing the buildup of charge on the capacitor charging circuitry upon one of the flashbulbs in the multiple array being flashed. The inhibiting or disenabling circuitry is comprised of a current sensing resistor commonly connected to all of the flashbulbs for sensing the in-rush of current through a flashbulb upon a respective static electronic switching device being turned on. The current sensing resistor is coupled to and controls the operation of an inhibiting or disenabling static electronic switching device that in turn is connected to and controls the further operation of the charging capacitor circuitry for discontinuing the supply of further charging current to the capacitor. In this manner, further gating of the thyristor switching device connected in circuit relationship with each of the flashbulbs is selectively controlled to provide selective sequential flashing of desired ones of the multiple photoflash bulbs.

Having described several embodiments of a new and improved static electronic control circuit for sequential flashing of multiple flash lamps by low cost static control circuits of integrated design, and constructed in accordance with the invention, it is believed obvious that other modifications and variations of the invention are possible in the light of the above teachings. It is, therefore, to be understood that changes may be made in the particular embodiments of the invention described which are within the full and intended scope of the invention as defined by the appended claims.

What we claim as new and desire to secure by Letters Patent of the United States is:

1. A circuit for sequentially flashing a plurality of photoflash lamps by sequential electrical flash signals, comprising a pair of voltage terminals and means adapted to connect said voltage terminals to a source of said electrical flash signals, a plurality of pairs of circuit points adapted for electrical connection thereto of respective individual lamps of said plurality of flash lamps, means connecting a first pair of said circuit points in electrical parallel with said pair of voltage terminals, a plurality of individually operable static electronic switching means respectively connected in series combination with the remaining said pairs of circuit points, means connecting each said series combination of switching means and circuit points in electrical parallel with said pair of voltage terminals, each of said electronic switching means being normally non-conductive and being provided with a control electrode adapted to render the respective switching means conductive when the voltage applied thereto exceeds a predetermined turn-on threshold voltage, capacitor charging circuit means connected to said pair of voltage terminals and adapted to cause capacitor charging from each occurrence of said sequential electrical flash signals and further adapted to simultaneously produce from said capacitor charging a plurality of turn-on electrical signals increasing in magnitude at different time rates, means connected to respectively apply said plurality of different time-rate turn-on electrical signals to said control electrodes of the individual switching means so that the turn-on signals will tend to exceed said predetermined turn-on voltages of the switching means at differing times thereby rendering conductive a switching means that is in series with an unflashed lamp thereby causing flashing of said last-mentioned lamp, and disenabling circuit means connected to sense said flashing of a lamp and respond thereto by discontinuing said increasing turn-on signals whereby no further lamps will be flashed by a single individual electrical flash signal.

2. A circuit as claimed in claim 1, in which said capacitor charging circuit means comprises a plurality of series circuits each comprising a capacitor and a resistor connected in series, said capacitors and resistors having values such that said series circuits have respectively different RC time constants, means connecting said series circuits in parallel to said pair of voltage terminals, and means respectively connecting said capacitors to said control electrodes of the individual switching means whereby the voltage charges on said capacitors provide said plurality of turn-on signals having differently increasing time rates.

3. A circuit as claimed in claim 2, in which said disenabling circuit comprises a current sensing resistor connected between one of said voltage terminals and said parallel connected combinations of the first pair of circuit points and the series combinations of switching means and circuit points, a static electronic switching device and a resistor connected in series across said pair of voltage terminals, said switching device having a control electrode connected to have applied thereto voltage derived from current flow in said current sensing resistor so as to render the switching device conductive in response to a lamp flashing, and means connecting an end of each of said series circuits to the junction of said switching device and last-named resistor whereby said switching device when conductive will provide a discharge path for said series circuits.

4. A circuit as claimed in claim 1, in which said capacitor charging circuit means comprises a single capacitor and a resistor connected in series across said pair of voltage terminals, and a plurality of voltage dropping means respectively connected between said single capacitor and said control electrodes of the individual switching means, said voltage dropping means providing respectively different voltage drops between said single capacitor and said control electrodes.

5. A circuit as claimed in claim 4, in which said voltage dropping means comprises a plurality of resistors connected across said single capacitor in a voltage-dividing network.

6. A circuit as claimed in claim 4, in which said voltage dropping means comprises differing numbers of diodes respectively connected between a terminal of said single capacitor and said control electrodes of the individual switching means.

7. A circuit as claimed in claim 4, in which said disenabling circuit comprises a current sensing resistor connected between one of said voltage terminals and said parallel connected combinations of the first pair of circuit points and the series combinations of switching means and circuit points, a static electronic switching device connected across said single capacitor and having a control electrode connected to have applied thereto voltage derived from current flow in said current sensing resistor so as to render the switching device conductive in response to a lamp flashing and provide a discharge path for said single capacitor.

8. A circuit as claimed in claim 1, in which said means connecting said first pair of circuit points in electrical parallel with said pair of voltage terminals comprises a resistor.

9. A circuit as claimed in claim 1, in which said disenabling circuit means comprises a current sensing resistor connected between one of said voltage terminals and said parallel connected combinations of the first pair of circuit points and the series combinations of switching means and circuit points, a static electronic switching device connected to said capacitor charging circuit means so as to selectively provide a capacitor discharge path therefor and having a control electrode connected to have applied thereto voltage derived from current flow in said current sensing resistor so as to render the switching device conductive in response to a lamp flashing and provide a discharge path for said capacitor charging circuit.

10. A circuit as claimed in claim 1, in which said disenabling circuit means comprises light sensing means arranged to sense light from said lamps when flashed and produce voltage in response thereto, a static electronic switching device connected to said capacitor charging circuit means so as to selectively provide a capacitor discharge path therefor and having a control electrode connected to have applied thereto voltage derived from said light sensing means so as to render the switching device conductive in response to a lamp flashing and provide a discharge path for said capacitor charging circuit.

11. A circuit as claimed in claim 1, including a plurality of logic gates respectively interposed between said capacitor charging circuit means and said control electrodes of the individual switching means.

12. A method of sequentially flashing a plurality of photoflash lamps by sequential electrical flash signals, comprising the steps of developing upon the occurrence of each said flash signal a plurality of simultaneous increasing voltages having respectively different relative voltage levels, associating each said increasing voltage with a different individual flash lamp, flashing whichever unflashed flash lamp is associated with the increasing voltage which first reaches a predetermined magnitude, sensing said flashing of a flash lamp, and discontinuing further increasing of said voltages whereby no more than one of said flash lamps becomes flashed per flash signal.

* * * * *